United States Patent [19]

Nagasawa et al.

[11] 4,033,906

[45] July 5, 1977

[54] CERAMICS HAVING NONLINEAR VOLTAGE CHARACTERISTICS AND METHOD FOR PRODUCING SAME

[75] Inventors: Ikuo Nagasawa; Kazuo Mukae, both of Kawasaki, Japan

[73] Assignee: Fuji Electric Company Ltd., Kawasaki, Japan

[22] Filed: June 3, 1975

[21] Appl. No.: 583,358

[30] Foreign Application Priority Data

June 3, 1974 Japan .............................. 49-62656
June 3, 1974 Japan .............................. 49-62657

[52] U.S. Cl. .............................. 252/519; 106/39.5; 106/73.2; 252/521; 338/20

[51] Int. Cl.² .................... C04B 35/00; H01C 7/10

[58] Field of Search .................. 252/521, 519, 518; 106/39.5, 73.2; 338/20

[56] References Cited

UNITED STATES PATENTS

| | | | |
|---|---|---|---|
| 3,503,029 | 3/1970 | Matsuoka | 252/518 X |
| 3,663,458 | 5/1972 | Masuyama et al. | 252/519 |
| 3,699,058 | 10/1972 | Matsuoka et al. | 252/521 |
| 3,928,242 | 12/1975 | May | 338/20 |

OTHER PUBLICATIONS

Matsuoka, M. "Nonohmic Properties of Zinc Oxide Ceramics" Japanese J. of Appl. Physics 10 (6) June, 1971, pp. 736–746.

*Primary Examiner*—Winston A. Douglas
*Assistant Examiner*—Mark Bell
*Attorney, Agent, or Firm*—Sughrue, Rothwell, Mion, Zinn and Macpeak

[57] ABSTRACT

Ceramics having nonlinear voltage characteristics comprising the product obtained on preparing a mixture of zinc oxide as a main component, and, as subcomponents, cobalt plus one of praseodymium or terbium, either in an elemental form or as a compound thereof, in an amount of from 0.1 to 8.0 atomic % for the cobalt, from 0.08 to 8.0 atomic % for the praseodymium and from 0.1 to 8.0 atomic % for the terbium, each calculated as cobalt, praseodymium and terbium, and calcining the mixture at a temperature in the range of from about 1150° to about 1400° C and a method for preparing the ceramics. An embodiment includes, as an additional subcomponent, lanthanum, either in an elemental form or as a compound in an amount of from 0.08 to 8.0 atomic %, calculated as lanthanum, with the zinc oxide, cobalt and praseodymium.

11 Claims, 3 Drawing Figures

CERAMICS HAVING NONLINEAR VOLTAGE CHARACTERISTICS AND METHOD FOR PRODUCING SAME

BACKGROUND OF THE INVENTION

1. Field of the Invention

This invention relates to a ceramic which has nonlinear voltage characteristics and is adapted to be used as an over-voltage protecting resistor and a method for producing the same.

2. Description of the Prior Art

Heretofore, over-voltage protecting resistors made of a silicon carbide varistor, a selenium varistor, and the like have been widely used practically. However, the over-voltage resistivity of a semiconductor element such as a diode, a transistor, and a thyristor is far lower than the resistivity of an ordinary electrical machine or piece of equipment, and when protection of the semiconductor element from an over-voltage is desired, a resistor used for that purpose must have the characteristics of a low limiting voltage and the greatest voltage non-linearity. In this respect, both a silicon carbide varistor and a selenium varistor do not have any significant voltage non-linearity, and furthermore, the limiting voltage of a silicon carbide varistor is high while the loading capability of a selenium varistor is low and the size thereof must be large. These features thus are the drawbacks of conventional over-voltage protecting resistors. In addition to the above-described resistors, an arrester having series gaps and an arresting tube are known. These are, however, not suitable for the protection of semi-conductor elements because of their high limiting voltage.

SUMMARY OF THE INVENTION

The present invention provides a ceramic which has a high voltage non-linearity and thus the drawbacks of conventional resistors can be overcome.

The ceramic is made by a process in which (a) zinc oxide (ZnO) is used as a principal compound, and (b) cobalt (Co) plus on of praseodymium (Pr) or terbium (Tb) are added thereto as subcomponents, either in an elemental form or as a compound thereof, in an amount calculated as the elements, of from 0.1 to 8.0 atomic % for the Co, from 0.08 to 8.0 atomic % for the Pr and from 0.1 to 8.0 atomic % for the Tb, and the substance thus obtained is calcined thereafter.

DETAILED DESCRIPTION OF THE INVENTION

Figure 1:
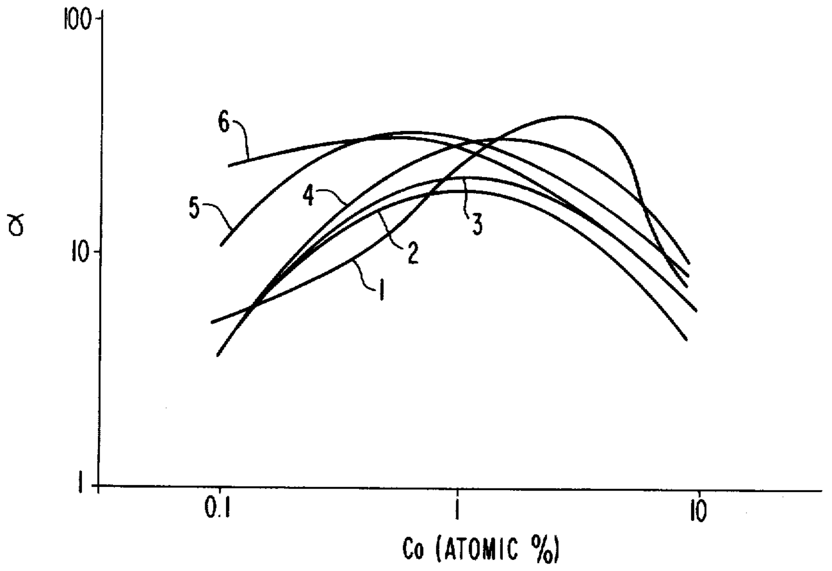
FIGS. 1, 2, and 3 are graphical representations of the characteristics of the ceramics according to the present invention, which vary depending on the ratio of the components employed.

The Pr, Co and Tb comprising the subcomponents can be added in the form of oxides such as $Pr_6O_{11}$, $Co_2O_3$and $Tb_4O_7$ or other compounds not having these chemical formula, or they can be added as Pr, Tb or Co per se, since the compounds or elements are changed during the subsequent calcining step into oxides of Pr, Tb and Co.

A current I flowing through a nonlinear voltage element at the time of the application of a voltage $V$ can be approximated by the following equation $$I = (V/C)^{\alpha}$$

wherein $C$ corresponds to the voltage per mm of the element when the current density is equal to 1 mA/cm², and $\alpha$ is the non-linearity factor in the voltage. It is desirable for $C$ to be selected at a suitable value depending on the use condition of the voltage element, and for $\alpha$ to be selected to be the largest possible value.

In the ceramic according to the present invention, if the amounts of the subcomponents added to the principal component are changed, or the calcining temperature is changed, the values of $C$ and $\alpha$ vary. For this reason, the amounts of the subcomponents added and the calcining temperature of the resultant substance are preferably adjusted so that the greatest possible value of $\alpha$ is obtained at a desired value of $C$.

In the ZnO series ceramic according to this invention, required advantageous effects cannot be obtained if only one of Pr or Tb and Co is employed. That is, when only Pr or Tb is employed, the $\alpha$ thus obtained is so small that the ceramic cannot be used practically, and when only Co is employed, the ceramic thus obtained exhibits very little voltage nonlinearity and is substantially equivalent to an ohmic resistor. A ceramic which has excellent voltage nonlinearity and which can be used practically is obtained only when Pr or Tb and Co are employed at an appropriate ratio and in the amounts according to this invention.

The reason why the lower limit of Pr is 0.08 atomic %, the lower limit of Tb is 0.1 atomic %, and the lower limit of Co is 0.1 atomic %, while the upper limits of the same elements are 8.0 atomic %, is as follows. Although there are some differences due to the calcining temperature, when the amounts of Pr or Tb and Co employed are less than 0.08 atomic % and 0.1 atomic %, respectively, no remarkable effects are obtained by the use of the Pr or Tb and Co, and the characteristics of the resistance element become inferior and indefinite. When the amounts of Pr or Tb and Co employed are more than 8.0 atomic %, the $\alpha$ tends to decrease, and the characteristics of the same element become unstable.

When the ceramic according to this invention is used for an ordinary a.c. over-voltage protecting resistor, the above-described composition of the ceramic provides characteristics satisfactory for such an application. However, when the ceramic is used in d.c. low voltage circuit (for instance, 24 V), the value of $C$ must be reduced. For this purpose, the addition of lanthanum (La) to the composition described above comprising ZnO, as a main compound, and Pr and Co, as subcomponents was found to be effective. That is, when lanthanum, as an element or as a compound, is employed in the above-described composition in an amount of from 0.08 atomic % to 8.0 atomic %, calculated as lanthanum, an appropriate value of C can be obtained. When the amount of lanthanum employed is less than 0.08 atomic %, no remarkable effect is observed, and when the amount of lanthanum employed exceeds 8.0 atomic %, the characteristics of the resistor thus obtained become unstable.

The calcining step is carried out, for instance, in air at a temperature of from about 1150° to about 1400° C, or preferably from 1300° to 1350° C. When the calcining temperature is lower than about 1150° C, the density of the calcined product is reduced, the mechanical strength thereof is weakened, and the electrical characteristics thereof become inferior. In contrast, when the calcining temperature exceeds about 1400° C, the value of $\alpha$ is reduced, and when the calcining temperature exceeds about 1500° C, a uniform calcined material becomes difficult to obtain, and difficulties are also experienced in reproducibility and control of the characteristics of the products.

The invention will now be described more specifically with respect to embodiments of the present invention.

EXAMPLE 1

Various ceramics were produced as follows. To ZnO, Pr and Co were added in the form of the compounds, $Pr_6O_{11}$ and $Co_2O_3$, and when La was required the La was added thereto in the form of $La_2O_3$, at various composition ratios and quantities. The mixtures thus obtained were kneaded sufficiently and were calcined at 700° C for 1 hour. Each of thus obtained substances was ground sufficiently, formed into circular discs of a diameter of 16 mm, and calcined at various temperatures for 1 hour. The ceramics thus produced were ground until a thickness of 1 mm was obtained, electrodes were attached on two surfaces thereof, and the characteristics of the ceramics were measured. The characteristics thus measured of the ceramic resistors are now indicated, instead of *C* and $\alpha$, by a voltage $V_1$ at the passage of a current therethrough of 1 mA and by $\alpha$, and described as follows.

Figure 2:
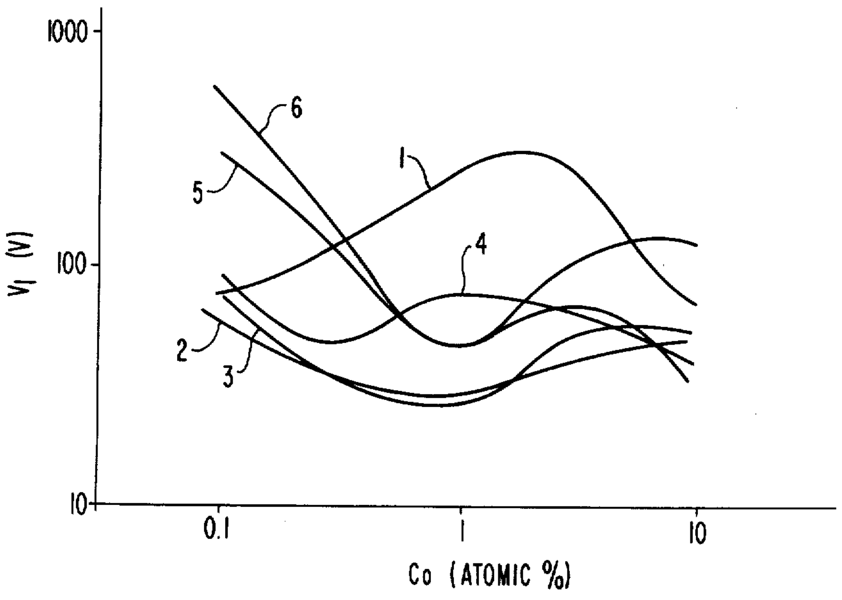

FIG. 1 shows the variations of the maximum values of $\alpha$, with the amount of La added being taken as a parameter, in the case where the calcining temperature was selected as 1300° C, Co was added in the form of $Co_2O_3$ in an amount of from 0.1 to 8.0 atomic %, calculated as Co, and Pr was added in the form of $Pr_6O_{11}$ in an amount of from 0.08 to 8.0 atomic %, calculated as Pr. In FIG. 1, Curve 1 corresponds to the case were La was not employed, Curve 2 corresponds to the case where La was employed at 0.1 atomic %, Curve 3 corresponds to the case where 0.3 atomic % of La was employed, Curve 4 corresponds to the case where 1.0 atomic % of La was employed, Curve 5 corresponds to the case where 3.0 atomic % of La was employed, and Curve 6 corresponds to the case where 8.0 atomic % of La was employed. In FIG. 2, various values of $V_1$ obtained for the ceramics which exhibit various values of $\alpha$ as indicated by the Curves 1 through 6 in FIG. 1 are plotted against the quantity of Co employed. From FIGS. 1 and 2, it is apparent that ceramics exhibiting superior nonlinear voltage characteristics could be obtained within the range of the amounts of the components according to this invention where the voltage $V_1$ ranges approximately from 30 V to 750 V, or particularly from 30 V to 150 V. Furthermore, it is of course possible to control $V_1$ over a wider range by varying the calcining temperature from the above-described value.

EXAMPLE 2

Various ceramics were produced as follows. To ZnO, Tb and Co were added in the form of the compounds, $Tb_4O_7$ and $Co_2O_3$, at various composition ratios and quantities. The mixtures thus obtained were kneaded sufficiently and were calcined at 700° C for 1 hour. Each of the thus obtained substances was ground sufficiently, formed into circular discs of a diameter of 16 mm, and calcined at various temperatures for 1 hour. The ceramics thus produced were ground and electrodes attached as described in Example 1 and the characteristics of the ceramics were measured as described in Example 1.

Figure 3:
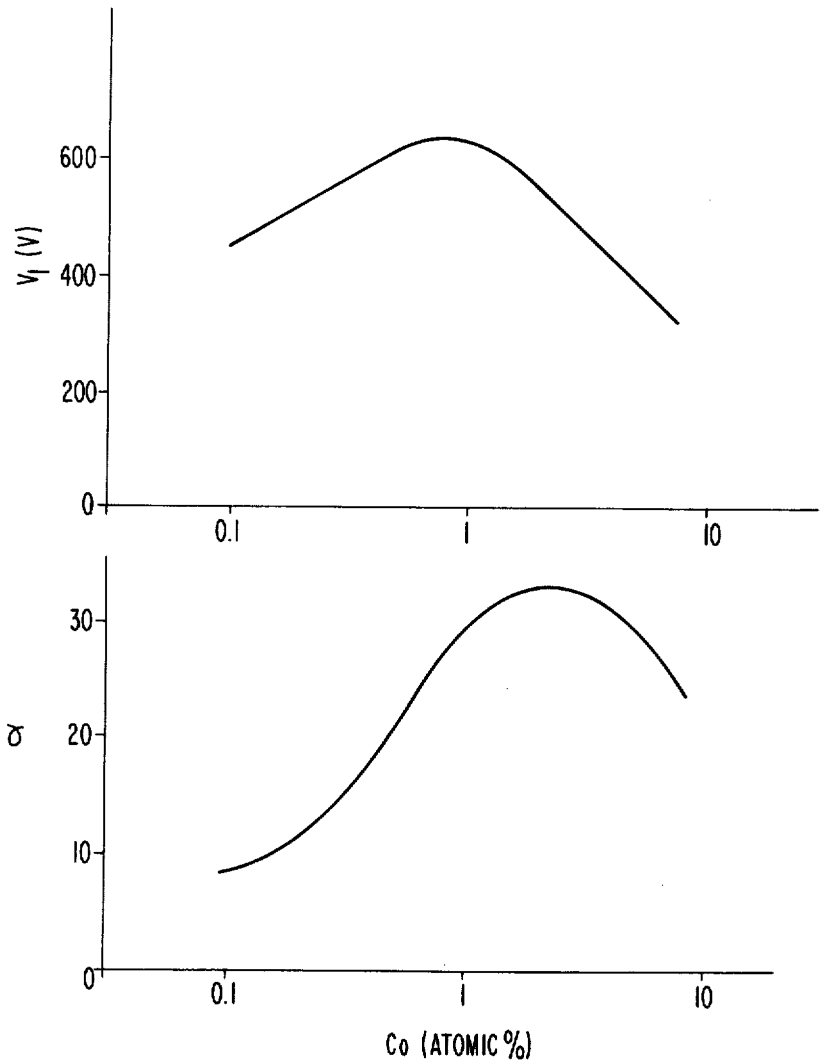

FIG. 3 shows the variations of the maximum values of $\alpha$ and the corresponding variations of the values of $V_1$ versus the amounts of $Co_2O_3$ employed in the case where the calcining temperature was 1300° C, and the Tb was added in the form of $Tb_4O_7$ in an amount of from 0.1 to 8.0 atomic %, calculated as Tb.

From FIG. 3, it is apparent that ceramics exhibiting superior nonlinear voltage characteristics can be obtained within the range of the amounts of the components according to this invention where the voltage $V_1$ ranges approximately from 250 to 650V. Furthermore, it is, of course, possible to control $V_1$ over a wider range by varying the calcining temperature from the above-described value.

As described above, the ceramics according to this invention can exhibit various limiting voltages and high nonlinearity factors in voltage by suitably controlling the calcining temperature and the amounts of the subcomponents employed, and therefore can be applied to the protection of various electronic devices rated at low voltages.

While the invention has been described in detail and with reference to specific embodiments thereof, it will be apparent to one skilled in the art that various changes and modifications can be made therein without departing from the spirit and scope thereof.

What is claimed is:

1. A ceramic having non-linear voltage characteristics consisting essentially of the calcined product obtained on calcining in air a mixture of (a) zinc oxide as a principal component and (b) cobalt plus one of praseodymium or terbium, either in elemental form or as a compound thereof, as subcomponents, in an amount of from 0.1 to 8.0 atomic % for the cobalt, from 0.08 to 8.0 atomic % for the praseodymium and from 0.1 to 8.0 atomic % for the terbium, each calculated as cobalt, praseodymium and terbium.

2. The ceramic of claim 1, wherein said ceramic comprises zinc oxide, an oxide of cobalt and an oxide of praseodymium.

3. The ceramic of claim 1 wherein said ceramic comprises zinc oxide, an oxide of cobalt and an oxide of terbium.

4. The ceramic of claim 1 wherein said mixture further contains zinc oxide, cobalt, and praseodymium and additionally lanthanum, either in an elemental form or as a compound thereof, in an amount of from 0.08 to 8.0 atomic %, calculated as lanthanum.

5. A method for producing a ceramic having non-linear voltage characteristics comprising preparing a mixture of (a) zinc oxide, as a main component and the remainder (b) cobalt plus one of praseodymium or terbium, either in elemental form or as a compound thereof as subcomponents, in an amount of from 0.1 to 8.0 atomic % for the cobalt, from 0.08 to 8.0 atomic % for the praseodymium and from 0.1 to 8.0 atomic % for the terbium, each calculated as cobalt, praseodymium and terbium and calcining the mixture in air at a temperature in the range of from about 1150° to about 1400° C.

6. The method of preparing the ceramic of claim 5, wherein said calcining is at 1300° to 1350° C.

7. The method of preparing the ceramic of claim 5, wherein said mixture is zinc oxide and cobalt and praseodymium in electrical form or as a compound thereof.

8. The method of preparing the ceramic of claim 5, wherein said mixture is zinc oxide and cobalt and terbium in elemental form or a compound thereof.

9. The method of producing the ceramic of claim 5, wherein said mixture further contains lanthanum, either in an elemental form or as a compound thereof in an amount of from 0.08 to 8.1 atomic %, calculated as lanthanum.

10. The ceramic of claim 1 obtained when in addition to calcining said mixture, said mixture is precalcined in air.

11. The method of claim 5 including the additional step of precalcining said mixture in air.

* * * * *